Feb. 26, 1929. 1,703,376
C. E. WEBBER
HARROW
Filed March 23, 1927
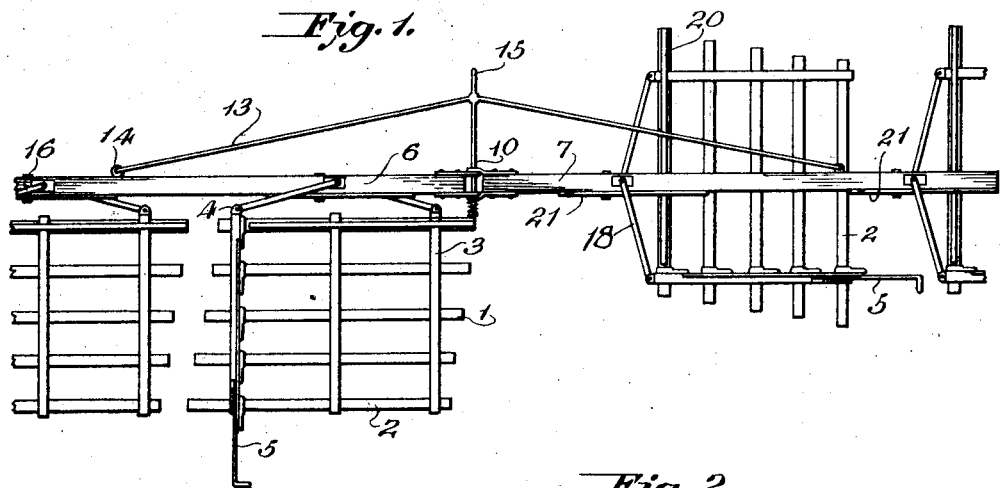
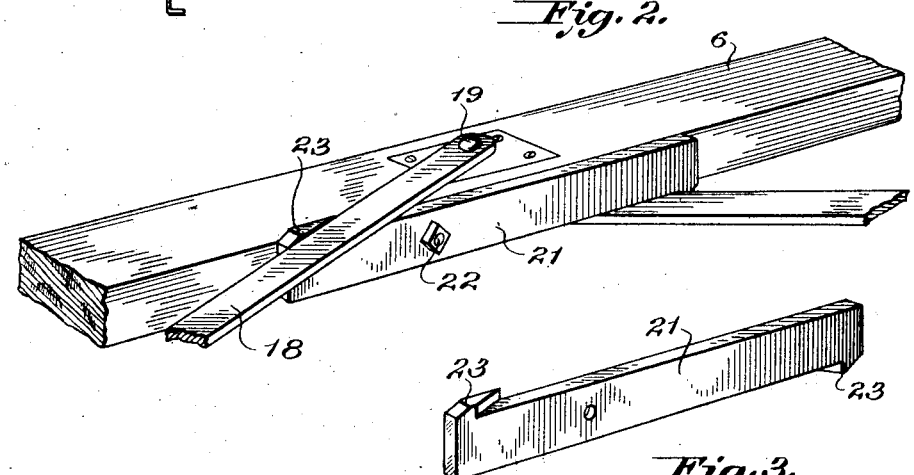
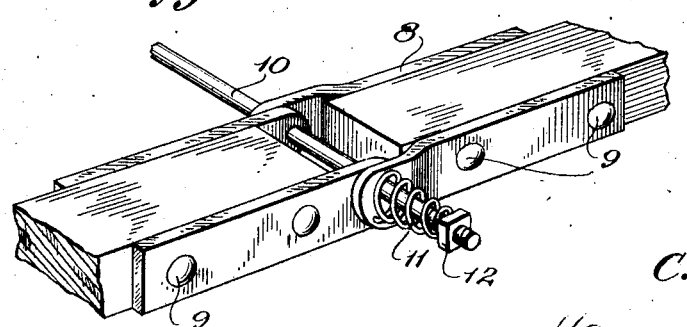
Inventor
C. E. Webber.
By William C. Linton
Attorney Patented Feb. 26, 1929.

1,703,376

UNITED STATES PATENT OFFICE.

CHARLES E. WEBBER, OF PONTIAC, ILLINOIS.

HARROW.

Application filed March 23, 1927. Serial No. 177,693.

This invention relates to improvements in harrows, and more particularly, to that type of harrow described and claimed in my United States Patent Number 1,567,778, having for an object to provide a harrow of the so-called "gang" type, wherein a plurality of harrows are collectively connected to a draft means, said harrows being adapted to be moved either in transversely or longitudinally disposed relations, that is, abreast of each other in one position and in single file or tandem relation in the other position.

It is also amongst the desideratums of the invention to provide a harrow construction having a draft bar or its equivalent supplied with differently located or arranged draft connections, whereby when a draft means is attached to one of said connections, the harrow sections will be caused to move over a surface in transverse relation, i. e., abreast of each other, whereas when the draft means is connected to the other draft connection, said harrow sections will be caused, with movement thereof, to automatically move or pivot into longitudinally disposed relation, i. e., single file or tandem.

The invention also aims to provide a construction having latch means for positively securing the harrow sections against swinging or pivotal movement when the same are arranged in transverse relation or abreast of each other, such means being automatically operable with pivoting of the harrow sections to their respective transverse positions.

Yet another object of the invention may be stated to reside in the provision of a draft bar for the harrow sections, said draft bar being so constructed as to permit of relative vertical movement between certain of the harrow sections, thus permitting the earth working elements or teeth of the harrows to remain in effectual harrowing engagement with the earth or soil, especially when the device is being moved over an irregular or comparatively hilly field.

Other objects of the invention will be in part obvious and in part pointed out hereinafter.

In order that the invention and its mode of operation may be readily understood by those skilled in the art, I have in the accompanying illustrative drawings and in the detailed following description based thereupon, set out one possible embodiment of my invention.

In these drawings:

Figure 1 is a fragmentary top plan view of the improved harrow wherein certain of the harrow sections are illustrated in relatively transverse position and others thereof are shown in relative longitudinal positions.

Figure 2 is an enlarged fragmentary detail in perspective illustrating the pivotal connection of the harrow sections to the draft bar and the latch means for securing said sections in their respective transversely arranged positions.

Figure 3 is a detail in perspective of the improved latching means, and

Figure 4 is an enlarged fragmentary detail in perspective showing the construction of the intermediate portion of the draft bar and the yieldable draft connection provided for the same.

Having more particular reference to the drawings, in connection with which like characters of reference will designate corresponding parts throughout, the invention may be stated to comprise a plurality of harrow sections generally indicated by the numeral 1, said sections being preferably composed of a plurality of relatively parallel tooth carrying bars 2 properly interconnected through the medium of transversely disposed connecting or tie bars 3; brackets 4 being provided upon certain of the ends of the outermost connecting bars 3 while a lever 5 is mounted upon each of the sections and has suitable connection with the tooth carrying bars 1 whereby they may be effectually adjusted or positioned so as to bring about the desired engagement of the earth working teeth with the soil to be harrowed.

A draft bar consisting of sections 6 and 7 is provided the construction, the adjacent or meeting ends of said bar being formed with bracket arms 8 riveted or otherwise suitably secured as at 9 to the adjacent marginal portions of said sections, while the inner ends of said brackets are extended and apertured whereby with interengagement thereof, a draft rod 10 may be passed therethrough, hence effecting a pivotal connection as between the draft bar sections 6 and 7; the inner end of the rod 10 having a coiled spring 11 engaged thereabout and bearing upon an adjusting nut 12, while the opposite end of said spring has bearing upon an adjacent portion of one of the brackets 8. Thus, it will be understood that a yieldable mounting of the draft rod 10 upon the pivotally interconnected sections of the draft bar 6 will be afforded; this rod 10 being also adapted to be trussed through the medium of a plurality of diagonally disposed rods 13 having their outer ends connected as at 14 to portions of the draft bar sections 6 and 7 while their adjacent ends are connected in a suitable manner to an outer portion of said rod 10, such rod, as will be noted, having a clevis or other suitable form of draft connection 15 provided thereon for obvious purposes.

A second draft connection or clevis 16 is connected to one end of the draft bar and as will be noted, is arranged at substantially right angles to the draft connection 15.

To effect connection of the harrow sections 1 with the sectional draft bar, each of said sections is provided with a pair of connecting bars 18, said bars being pivoted to the portions 4 of the connecting bars 3 and having their opposite ends arranged in vertically spaced relation as is indicated in the Figures 1 and 2 so that the free ends of said connecting bars 18 may be pivoted through the medium of pivot bolts 19 to the draft bar sections; it being noted in this connection that said free ends of the connecting bars 18 are disposed above and below the opposite sides of the draft bar, as is shown in the Figure 2. Thus, it will be understood that the harrow sections 1 will be pivotally connected to the sectional draft bar and, at times, will be caused to have pivotal or swinging movement with respect thereto.

With pivotal or swinging movement of the harrow sections 1 into longitudinal relation, that is, single file, as is illustrated by a portion of the Figure 1, said sections will move beneath the draft bar and to facilitate removement in this direction, bearing bars 20 are secured to the upper marginal portions of certain of the tooth carrying bars 2 of each of the harrow sections 1, consequently permitting the harrow sections to slidably engage under the draft bar with the least possible resistance.

That means will be provided the pivotally connected harrow sections 1 whereby the same will be secured against pivotal or swinging movement subsequently to arrangement thereof in transverse relation, that is, abreast of each other, latch arms 21 are provided and one of such arms is pivoted, off center, to the inner side or marginal portions of the several draft bar sections 6 and 7, as is shown at 22, the extremities of said latch bars having outwardly bevelled lug-like projections 23 formed upon the upper and lower marginal portions thereof. In this connection, it is to be noted that the widths of the latch bar 21 approximately correspond to the thickness of the draft bar sections 6 and 7, while the lug-like projections 23 formed upon the upper and lower marginal portions thereof extend slightly beyond their respective sides of said draft bar sections 6 and 7.

In operation of the improved harrow construction and under usual working conditions, it is desirable that the sections 1 shall be arranged in transverse relation, i. e., abreast of each other as is shown in a portion of the Figure 1, draft means of a suitable character being connected to the draft connection 15. When in transverse or abreast relation, it will be understood that the off-center pivoted latch bars 21 will have the lug-like projections 23 thereon engaged with portions of the connecting bars 18 and in this way, will lock said arms against further material pivotal movement with respect to the draft bar. When it is desired to permit pivotal or swinging movement of the harrow sections 1 with respect to the sectional draft bar, the longer sides or portions of the latch bars 21 are thrust upwardly, thus disengaging the relatively opposed lug like projections 23 from their respective connecting bars 18 and allowing of such movement. In this connection, it is to be also noted that with swinging movement of the harrow sections 1 from longitudinal or tandem relation into transverse or abreast relation, the connecting bars 18 upon engaging with the adjacent extremities of the latch bars 21 will be caused to swing in directions to permit of riding of the engaging portions of said connecting bars thereover until the projections 23 are passed, whereupon the heavier or longer portion of each of the latch bars 21 will cause the same to be returned to their normal latching positions as respects said bars 18, hence, securing the same together with their respective harrow sections 1 in the transverse or abreast positions.

At times, and especially, when it is desired to move the harrow construction from one field to another, it becomes desirable that the harrow sections 1 shall be moved into longitudinal or single file relation with respect to the draft bar and to effect this movement, the draft means employed in connection with the harrow construction is connected to the clevis 16. With the application of pull to the draft bar, the same will be caused to follow the draft means and at this time, the pivotal latch bars 21 are swung to disengaged positions so that free pivotal movement of the harrow section 1 with respect to the draft bar will be allowed. Thus, as the draft bar is pulled or drawn along, said sections 1 will pivot and thereby be swung into longitudinal or single file relation with respect to said bar, hence, materially decreasing the width of the construction and allowing it to be drawn through constricted ways or openings, such for example as gateways, narrow roads, etc.

Assuming now that it is desired to have the harrow sections 1 arranged in transverse or abreast relation, the draft means are connected to the right angularly disposed draft connection 15. With the application of pull to this connection 15, the various arrow sections 1 will pivot or swing to follow the same and in such pivotal or swinging movement the lower arm 18 will be caused to ride on the bevelled portion of lug 23 and said sections will be automatically brought to their respective transverse or abreast positions, immediately following which, the latch arms 21 will automatically engage with adjacent portions of the connecting bars 18 and thereby lock the sections 1 in their respective transverse positions.

As will be noted, as the draft sections 1 are swung from transverse or abreast positions to longitudinal or tandem positions, or vice versa, such movement will be automatically accomplished, in that the sections will follow the line of pull applied to the draft bar, whether said line of pull be longitudinally or transversely directed or applied thereto. Because of this, it will be understood and appreciated that the route or collective positioning of the harrow sections 1 will depend entirely upon the line of draft or pull applied to the sectional draft bar.

Because of the pivotal jointure between the sections 6 and 7 of the draft bar, it will be understood that a degree of adjustability will be given the construction, permitting it to ride evenly over a field or other surface in process of harrowing, in that said draft bar sections will pivot and thereby will compensate for any irregularities in the field or surface being harrowed.

Manifestly, the construction shown is capable of considerable modification and such modification as is within the spirit of my claims, I consider within the scope of my invention.

I claim:

1. A harrow comprising a plurality of toothed sections, a draft bar, said sections being pivoted to the bar, means engageable with said sections at times for locking the same in adjusted positions with respect to the draft bar, and the sections being pivotally movable into transverse or longitudinal relation to said bar dependent upon the line of draft applied thereto.

2. A harrow comprising a plurality of toothed sections, a draft bar, relatively spaced and substantially right angularly opposed draft connections on said bar, said sections being pivoted to the bar and adapted to be moved into transverse or longitudinal relation to the bar dependent upon the line of draft applied to said right angularly opposed connections, and latching means carried on the bar engageable with the sections for locking the same in certain of their adjusted positions with respect to the draft bar.

3. A harrow comprising a plurality of toothed sections, a draft bar, a plurality of draft connections on said bar, said sections being pivoted to the bar and adapted to be moved into transverse or longitudinal relation thereto, dependent upon the line of draft applied to said connections, and latch bars pivotally mounted upon portions of the draft bar and engageable with portions of said sections for locking the same in certain of their adjusted positions with respect to the draft bar.

4. A harrow comprising a plurality of toothed sections, a draft bar, a plurality of relatively spaced and substantially right angularly arranged draft connections on said bar, said sections being pivoted to the bar throughout its length and adapted to be moved into transverse or longitudinal relation thereto, dependent upon the line of draft applied to the connections, and a plurality of latch arms pivoted to portions of said draft bar in proximity to said section and adapted to be engaged with portions of said sections whereby to lock the same in certain of their adjusted positions with relation to the draft bar.

5. A harrow comprising a plurality of toothed sections, a sectional draft bar, the sections of which are pivoted for vertical adjustment and to which said toothed sections are collectively and pivotally connected, a plurality of substantially right angularly arranged draft connections on portions of said bar, said toothed sections adapted to be moved into relative tandem or abreast relation with respect to said bar dependent upon the line of draft applied to the draft connections, and means engageable with said toothed sections for locking the same in certain of their adjusted positions with respect to the draft bar.

In witness whereof I have hereunto set my hand.

CHARLES E. WEBBER.